US012804376B2

(12) United States Patent
So

(10) Patent No.: US 12,804,376 B2
(45) Date of Patent: Nov. 17, 2026

(54) UE 5GS SYSTEM AMF MOBILITY EVENT EXPOSURE SUPPORT FOR UAS

(71) Applicant: INNOPEAK TECHNOLOGY, INC., Palo Alto, CA (US)

(72) Inventor: Tricci So, Palo Alto, CA (US)

(73) Assignee: INNOPEAK TECHNOLOGY, INC., Palo Alto, CA (US)

( * ) Notice: Subject to any disclaimer, the term of this patent is extended or adjusted under 35 U.S.C. 154(b) by 543 days.

(21) Appl. No.: 18/558,357

(22) PCT Filed: May 3, 2022

(86) PCT No.: PCT/US2022/027404

§ 371 (c)(1),
(2) Date: Oct. 31, 2023

(87) PCT Pub. No.: WO2022/198147

PCT Pub. Date: Sep. 22, 2022

(65) Prior Publication Data

US 2024/0236638 A1 Jul. 11, 2024

Related U.S. Application Data

(60) Provisional application No. 63/183,556, filed on May 3, 2021.

(51) Int. Cl.

*H04W 4/12* (2009.01)
*H04W 8/12* (2009.01)
*H04W 12/06* (2021.01)

(52) U.S. Cl.

CPC ............... *H04W 8/12* (2013.01); *H04W 4/12* (2013.01); *H04W 12/06* (2013.01)

(58) Field of Classification Search

CPC ................................. H04W 8/12; H04W 4/12
See application file for complete search history.

(56) References Cited

U.S. PATENT DOCUMENTS

| | | | | |
|---|---|---|---|---|
| 2020/0045753 | A1 | 2/2020 | Dao et al. | |
| 2020/0077356 | A1 | 3/2020 | Youn et al. | |
| 2021/0029517 | A1 | 1/2021 | Zhu | |
| 2021/0051444 | A1 | 2/2021 | Ryu et al. | |
| 2021/0259045 | A1* | 8/2021 | Prabhakar .............. | B64U 10/14 |
| 2022/0053329 | A1* | 2/2022 | Kim ........................ | G06F 21/10 |

OTHER PUBLICATIONS

International Search Report in International Application No. PCT/US2022/027404, mailed Jul. 26, 2022.
Written Opinion of the International Searching Authority in International Application No. PCT/US2022/027404, mailed Jul. 26, 2022.

* cited by examiner

*Primary Examiner* — Michael T Vu
(74) *Attorney, Agent, or Firm* — Ladas & Parry, LLP

(57) ABSTRACT

A computer-implemented method for subscribing or unsubscribing to mobility event notifications, a system, and a non-transitory computer-readable storage medium are provided by the present application. The computer-implemented method includes: determining a mobility event associated with a user equipment (UE); generating a request to subscribe to the mobility event notifications or to unsubscribe from the mobility event notifications in response to the mobility event; sending the request; receiving a response in response to the request; and acknowledging subscribing or unsubscribing to the mobility event notifications based on the response.

14 Claims, 6 Drawing Sheets

UE 5GS SYSTEM AMF MOBILITY EVENT EXPOSURE SUPPORT FOR UAS

CROSS-REFERENCE TO RELATED APPLICATIONS

The present application is a 35 U.S.C. 371 National Phase Application of International Patent Application No. PCT/US2022/027404 filed on May 3, 2022, which claims priority to and benefit of U.S. Provisional Patent Application No. 63/183,556 filed May 3, 2021 and entitled "UE 5GS SYSTEM AMF MOBILITY EVENT EXPOSURE SUPPORT FOR UAS", the disclosures of which are incorporated herein by reference in their entireties.

TECHNICAL FIELD

The present disclosure relates to the field of communications, and in particular to a computer-implemented method for subscribing or unsubscribing to mobility event notifications, a system, and a non-transitory computer-readable storage medium.

BACKGROUND

Fifth-generation wireless (5G) is an iteration of a cellular technology standard for broadband cellular networks, required by International Mobile Telecommunications as the standard to support an all Internet Protocol (IP) network. 5G technology supports faster data rates, higher connection density, and much lower latency. 5G was deployed as the planned successor to the 4G networks which provide connectivity to most current cellphones. 5G technology has been engineered to greatly increase the speed and responsiveness of wireless networks. With 5G, data transmitted over wireless broadband connections can travel at multi-gigabit speeds, with potential peak speeds as high as 20 gigabits per second (Gbps) by some estimates. These speeds greatly exceed wireline network speeds and offer latency of 1 millisecond (ms) or lower, which is useful for applications that require real-time feedback. Thus, 5G technology can enable a sharp increase in the amount of data transmitted over wireless systems due to more available bandwidth and advanced antenna technology.

BRIEF DESCRIPTION OF THE DRAWINGS

The present disclosure, in accordance with one or more various embodiments, is described in detail with reference to the following figures. The figures are provided for purposes of illustration only and merely depict typical or exemplary embodiments.

Figure 1:
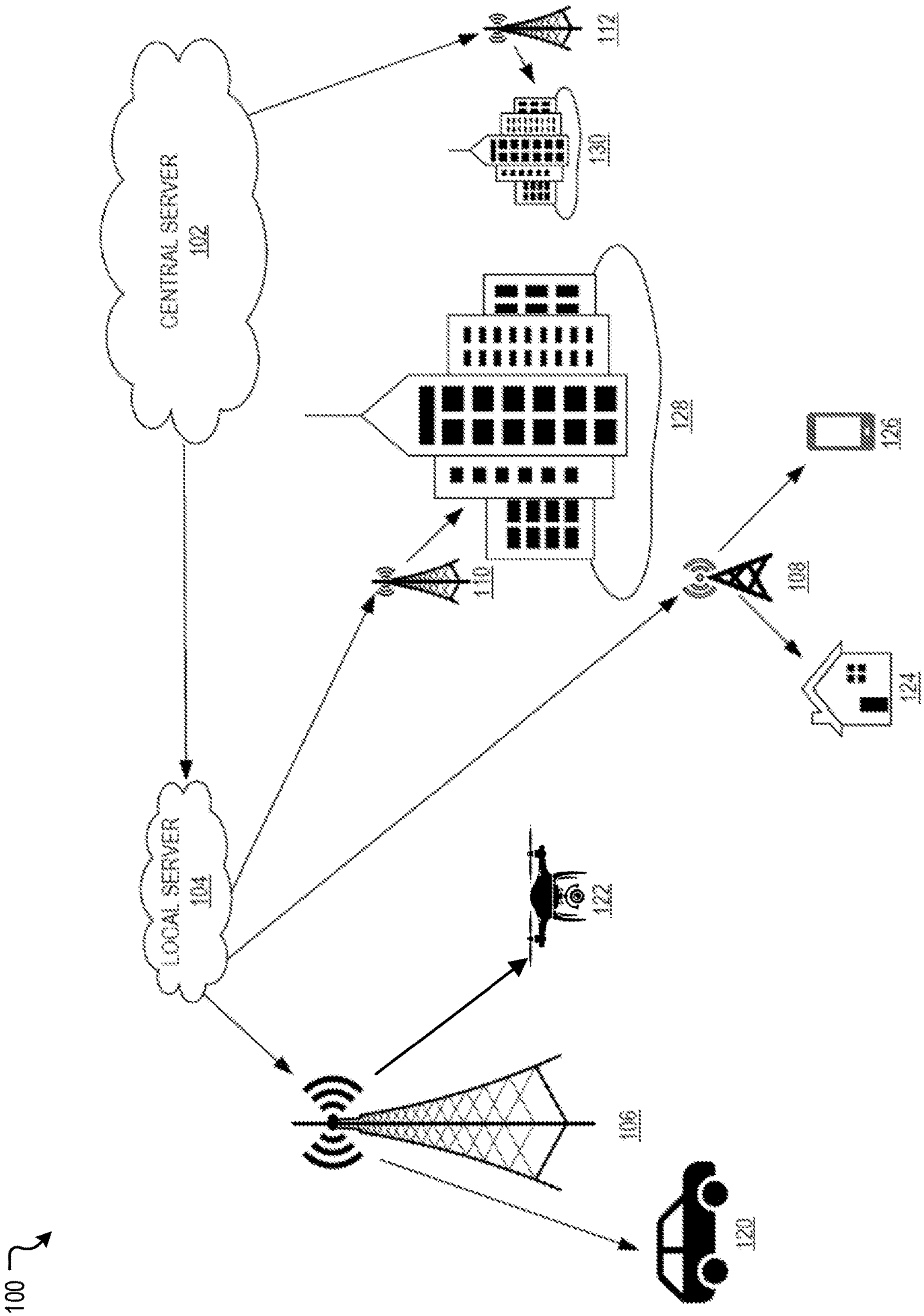
FIG. 1 illustrates an example network in which various embodiments of the present disclosure may be implemented.

The figures are not exhaustive and do not limit the present disclosure to the precise form disclosed.

SUMMARY

Various embodiments of the present disclosure provide a computer-implemented method for subscribing or unsubscribing to mobility event notifications comprising determining a mobility event associated with a user equipment (UE); generating a request to subscribe to the mobility event notifications or to unsubscribe from the mobility event notifications in response to the mobility event; sending the request; receiving a response in response to the request; and acknowledging subscribing or unsubscribing to the mobility event notifications based on the response.

Various embodiments of the present disclosure provide a system including at least one processor; and a memory storing instructions that, when executed by the at least one processor, cause the system to perform determining a mobility event associated with a user equipment (UE); generating a first request to subscribe to the mobility event notifications; receiving a notification associated with a subscription to the mobility event notifications; determining a revocation of authorization received from an uncrewed aircraft system (UAS) service supplier; and generating a second request to unsubscribe from the mobility event notifications based on the revocation of authorization.

In some embodiments of the system, the instructions cause the system to further perform: initiating an authorization procedure in response to the mobility event; determining the authorization procedure succeeded; and determining the UE is not subscribed to the mobility event notifications, wherein the request to subscribe to the mobility event notifications is generated based on the determination the authorization procedure succeeded and the determination the UE is not subscribed to the mobility event notifications.

In some embodiments of the system, the instructions cause the system to further perform: initiating an authorization procedure in response to the mobility event; determining the authorization procedure succeeded; and determining the UE is not subscribed to the mobility event notifications, wherein the request to subscribe to the mobility event notifications is generated based on the determination the authorization procedure succeeded and the determination the UE is not subscribed to the mobility event notifications.

In some embodiments of the system, the instructions cause the system to further perform: initiating an authorization procedure in response to the mobility event; determining the authorization procedure failed; and determining the UE is subscribed to the mobility event notifications, wherein the request to unsubscribe from the mobility event notifications is generated based on a determination the authorization procedure failed and the determination the UE is subscribed to the mobility event notifications.

In some embodiments of the system, the request to subscribe to the mobility event notifications includes a subscription correlation ID for management of a subscription for mobility event notifications and the response includes a first event report corresponding to the subscription.

In some embodiments of the system, the request to subscribe to the mobility event notification is a Namf_EventExposure_Subscribe request and the request to unsubscribe from the mobility event notifications is a Namf_EventExposure_UnSubscribe request.

In some embodiments of the system, the UE is an uncrewed aerial vehicle (UAV).

Various embodiments of the present disclosure provide a non-transitory computer-readable storage medium including instructions that, when executed by at least one processor of a computing system, cause the computing system to: determining a termination of a user equipment (UE) subscription; generating a request to unsubscribe to the mobility event notifications from an Access Mobility and Management Function (AMF) in response to the termination of the UE subscription; sending the request to the AMF; and receiving a response from the AMF in response to the request, wherein the response acknowledges the unsubscribe.

In some embodiments of the non-transitory computer-readable storage medium, the instructions cause the computing system to further perform: initiating an authorization procedure in response to the mobility event; determining the authorization procedure succeeded; and determining the UE is not subscribed to the mobility event notifications, wherein the request to subscribe to the mobility event notifications is generated based on the determination the authorization procedure succeeded and the determination the UE is not subscribed to the mobility event notifications.

In some embodiments of the non-transitory computer-readable storage medium, the instructions cause the computing system to further perform: initiating an authorization procedure in response to the mobility event; determining the authorization procedure failed; and determining the UE is subscribed to the mobility event notifications, wherein the request to unsubscribe from the mobility event notifications is generated based on a determination the authorization procedure failed and the determination the UE is subscribed to the mobility event notifications.

In some embodiments of the non-transitory computer-readable storage medium, the request to unsubscribe to the mobility event notifications includes a subscription correlation ID for management of a subscription for mobility event notifications.

In some embodiments of the non-transitory computer-readable storage medium, the instructions further cause the computing system to further perform: receiving an authorization revocation request, wherein the request to unsubscribe is subsequent to the receiving the authorization revocation request.

In some embodiments of the non-transitory computer-readable storage medium, the request to unsubscribe from the mobility event notifications is a Namf_EventExposure_UnSubscribe request These illustrative embodiments are mentioned not to limit or define the disclosure, but to provide examples to aid understanding thereof. Additional embodiments are discussed in the Detailed Description, and further description is provided there.

DETAILED DESCRIPTION

As described above, fifth-generation wireless (5G) is an iteration of a cellular technology standard for broadband cellular networks, required by International Mobile Telecommunications as the standard to support an all Internet Protocol (IP) network. The 3rd Generation Partnership Project (3GPP) provides standards related to 5G technology. 5G technology supports faster data rates, higher connection density, and much lower latency. 5G was deployed as the planned successor to the 4G networks which provide connectivity to most current cellphones. 5G technology has been engineered to greatly increase the speed and responsiveness of wireless networks. With 5G, data transmitted over wireless broadband connections can travel at multi-gigabit speeds, with potential peak speeds as high as 20 gigabits per second (Gbps) by some estimates. These speeds greatly exceed wireline network speeds and offer latency of 1 millisecond (ms) or lower, which is useful for applications that require real-time feedback. Thus, 5G technology can enable a sharp increase in the amount of data transmitted over wireless systems due to more available bandwidth and advanced antenna technology.

Due in part to the increase in the amount of data transmitted over wireless systems, 5G technologies have enabled wireless capabilities in a variety of technologies. For example, 5G technologies can support wireless communications with an Uncrewed Aircraft System (UAS) capable device, sometimes referred to as an Uncrewed Aerial Vehicle (UAV). With the support of 5G wireless communications, UAV technologies can expand capabilities that may previously have been limited by communication restrictions. The 3rd Generation Partnership Project (3GPP) has published standards related to the use of 5G technologies in UAVs. However, these standards fail to address various technological challenges associated with the use of 5G technologies in UAVs. For example, in a 5G system that supports UAS, there is no mechanism for making a UAS NF aware of mobility events for a UAS capable device. As a UAS capable device, a UAV, travels through an area with 5G wireless communication support, the UAV may experience a handover from one Access Mobility and Management Function (AMF) to another. In these scenarios, the AMF from which the UAV is handed off (e.g., the old AMF) and the AMF to which the UAV is handed off (e.g., the new AMF) can coordinate the handover with the UAV. However, there is no coordination between the old AMF and the new AMF with the UAS NF. This lack of coordination creates technological challenges with 5G technologies that rely on the UAS NF. For example, UAV UAS Authentication and Authorization (UUAA) procedures are generally supported by the AMF and the UAS NF. Thus, UUAA procedures can encounter issues in scenarios where the UAS NF is unaware of a handover from an old AMF to a new AMF. Furthermore, in scenarios where the UAS NF is unaware of the handover from the old AMF to the new AMF, the UAS NF may not be aware of UUAA context that was transferred from the old AMF to the new AMF, which may further cause issues in UUAA procedures. Thus, 5G technologies face technological challenges when mobility events occur in that the UAS NF is unaware of a handover from an old AMF to a new AMF and the UUAA context associated with the handover.

Accordingly, the present disclosure provides solutions that address the technological challenges described above. In various embodiments, the present disclosure provides for notification of UAV mobility events that allow the UAS NF to correctly update its local UUAA context when a UAV experiences a handover from an old AMF to a new AMF (e.g., changes its mobility anchor from the old AMF to the new AMF). For example, during a handover of a UAV from an old AMF to a new AMF, the new AMF may trigger a UUAA Registration (UUAA-MM) procedure with a UAS NF associated with the UAV. The UUAA-MM procedure can register the UAV with a UAS service supplier, such as an User Equipment (UE) specific Search Space (USS) or Uncrewed Traffic Management (UTM) service. In this example, if the UUAA-MM procedure was successful and the UAS NF has not previously subscribed to the new AMF for mobility events (e.g., Mobility Events Exposure), the UAS NF sends a request to the new AMF to subscribe to mobility event notifications. The new AMF acknowledges the request to subscribe by sending a confirmation response. Further, UUAA context can be transferred from the old AMF to the new AMF during the handover of the UAV from the old AMF to the new AMF. The new AMF can provide the transferred UUAA context to the UAS NF. As another example, the UUAA-MM procedure triggered by the handover of the UAV from the old AMF to the new AMF may not be successful. If the UUAA-MM procedure is not successful and the UAS NF has previously subscribed to the new AMF for mobility events, then the UAS NF can send a request to the new AMF to unsubscribe to further mobility event notifications. The new AMF acknowledges the request to unsubscribe by sending a confirmation response. Thus, as illustrated in these examples, the UAS NF can be made aware of a new AMF when a mobility event occurs as well as be notified of further mobility events.

Furthermore, in various embodiments, the present disclosure provides for proposals to the 3GPP standards for 5G technologies. For example, 3GPP TS 23.502 provides "Exposure of Mobility Events from AMF" which details standards for AMF Mobility Event Exposure capabilities. The present disclosure sets forth proposals that may be implemented in the 3GPP standards to allow for the UAS NF to subscribe to an appropriate AMF for notification of mobility events. Further details of the present disclosure are discussed herein.

Before describing the details of the various embodiments contemplated herein, it would be beneficial to describe a communications network, such as a cellular or other wireless wide area network (WWAN) to which a device may connect. FIG. 1 illustrates an example network 100 in which or with which various embodiments of the present disclosure may be implemented. For example, FIG. 1 illustrates an example network 100 in which a 5G system may be implemented. A variety of devices may connect to the 5G system, such as vehicle 120, Uncrewed Aircraft Vehicle (UAV) 122, house 124, and smartphone 126. Various other wireless devices may be equipped with telecommunication functions and used in the 5G system as well. For example, cellular telephones, laptop computers equipped with mobile broadband adapters, or other computing devices may be used. Such devices may be equipped with 5G capabilities to take advantage of the 5G system.

A mobile network, such as example network 100, can be thought of as including two component networks, the radio access network (RAN) and the core network. A mobile network's RAN may include various infrastructure, such as base stations/cell towers, masts, in-home/in-building infrastructure, and the like. The RAN allows users of devices, which can be referred to as user equipment (UE), such as smartphones, tablet computers, laptops, vehicle-implemented communication devices (e.g., vehicles having vehicle-to-vehicle (V2V) capabilities), and the like, to connect to the core network. In a 5G system, the 5G core can be described as the part of a 5G network deployment that provides 5G services to subscribers, such as a user of UAV 122. The 5G core can provide 5G services to subscribers through a RAN, such as a 5G NR RAN. The 5G core can also serve as a gateway to other networks, such as a public switched telephone network or a public cloud.

FIG. 1 illustrates a plurality of small base stations or small cells and macro base stations or macro cells (e.g., macro cells 106, 110, and 112, and small cell 108). Macro cells can refer to tall, high-powered "macro" base stations/cell towers that are able to maintain network signal strength across long, large distances. Macro cells may use multiple input, multiple output (MIMO) antennas that may have various components that allow data to be sent and/or received simultaneously. In the example network 100 of FIG. 1, macro cell 106 may provide wireless broadband coverage and communications to vehicle 120 and UAV 122. Macro cell 110 may provide broadband service to an area, such as a city or municipality 128. Likewise, macro cell 112 may provide broadband coverage to an area, such as a city or municipality 130.

Small cells can refer to wireless transmitters or wireless receivers implemented as micro base stations designed to provide coverage to areas smaller than those afforded coverage by macro cells (e.g., about 100 meters (m) to 200 m for outdoor 5G small cells). Indoor 5G small cell deployments may provide coverage on the order about 10 m. Small cells can be mounted or integrated onto streetlights, utility poles, buildings, and like macro cells, may also leverage massive MIMO antennas. In the example network 100 of FIG. 1, small cell 108 provides broadband coverage to a house 124 and smartphone 126.

The core network may comprise the mobile exchange and data network used to manage the connections made to, from, or via the RAN. As illustrated in FIG. 1, the core network of network 100 may include central server 102 and local server 104. Central server 102 is shown to effectuate broadband service to area 130 by way of macro cell 112. Central server 102 may also operatively connect to local server 104, which in turn, provides broadband connectivity by way of macro cells 106 and 110, as well as small cell 108. The use of distributed servers, such as local server 104, can improve response times, thereby reducing latency. The core network may leverage network function virtualization (e.g., instantiation of network functions using virtual machines via the cloud rather than hardware) to provide these lower response times, and provide faster connectivity.

As a device, such as vehicle 120, UAV 122, or smartphone 126, travels from one cell to another, connectivity can be maintained by handing off access to the network from one cell to the other. For example, in a 5G system, the Access and Mobility Management Function (AMF) can handle connection and mobility management tasks between a device and the 5G core. As the device travels from one cell to another, the AMF can handover these connection and mobility managements tasks to another AMF. As described above, 5G systems do not provide for notifying network functions (NF) of a device, such as a UAS, when such handover events occur. Thus, as further described herein, the present disclosure provides for communication of mobility events in 5G systems to enable, for example, the NF of a UAS to be notified when the UAS experiences a handover from one AMF to another AMF.

Figure 2:
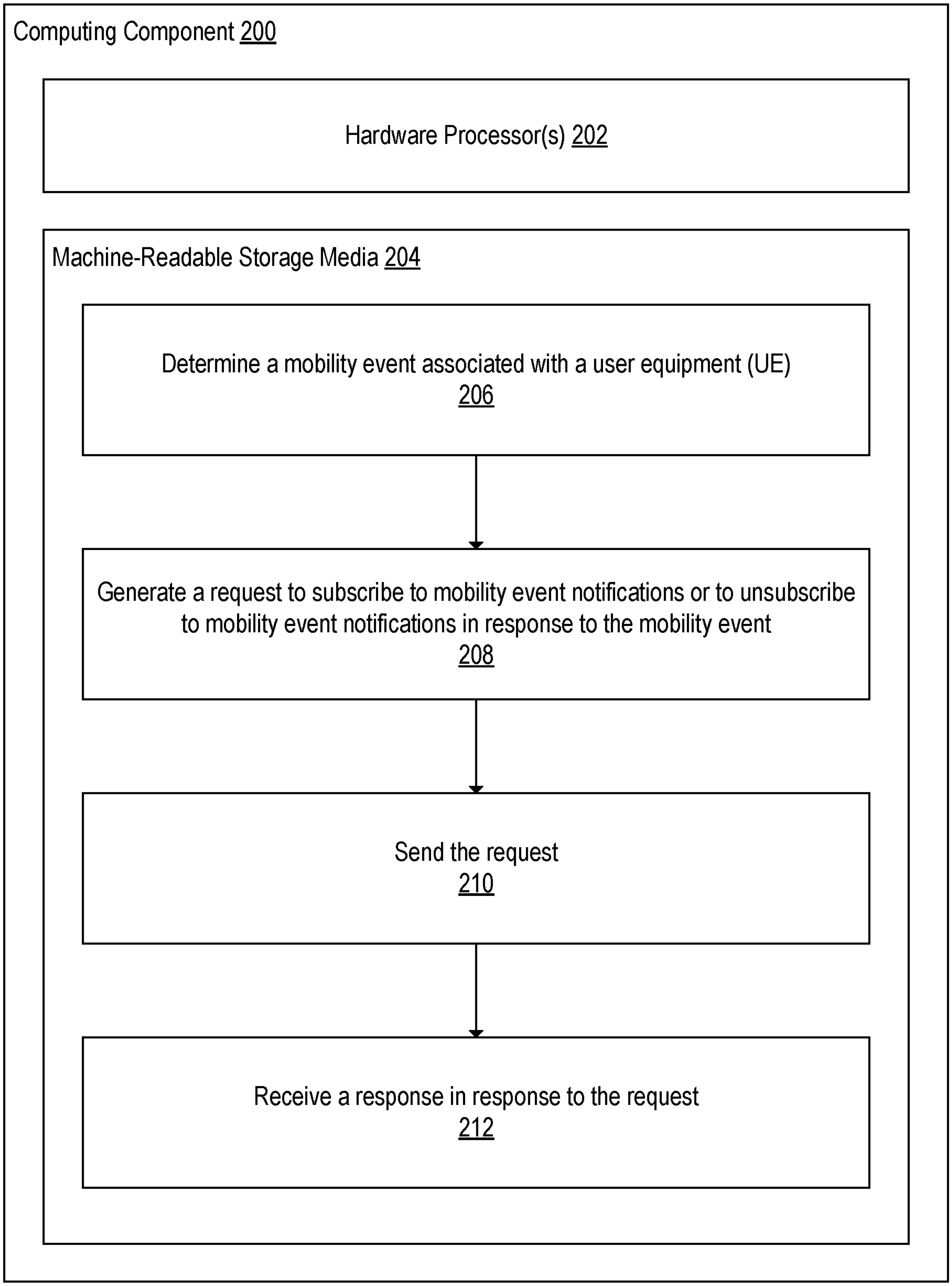
FIG. 2 illustrates a computing component that includes one or more hardware processors and machine-readable storage media storing a set of machine-readable/machine-executable instructions according to various embodiments of the present disclosure.

FIG. 2 illustrates a computing component 200 that includes one or more hardware processors 202 and machine-readable storage media 204 storing a set of machine-readable/machine-executable instructions that, when executed, cause the one or more hardware processors 202 to perform an illustrative method for AMF mobility event exposure support for UAS, according to various embodiments of the present disclosure. The computing component 200 may be, for example, the computing system 500 of FIG. 5. The hardware processors 202 may include, for example, the processor(s) 504 of FIG. 5 or any other processing unit described herein. The machine-readable storage media 204 may include the main memory 506, the read-only memory (ROM) 508, the storage 510 of FIG. 5, and/or any other suitable machine-readable storage media described herein.

At block 206, the hardware processor(s) 202 may execute the machine-readable/machine-executable instructions stored in the machine-readable storage media 204 to determine a mobility event associated with a user equipment (UE). In various embodiments, a mobility event can be associated with a change in location or a change in access of a UE. For example, a mobility event can occur when a UE, such as an unmanned aerial vehicle (UAV), travels from one location to another location, causing a handover from one Access Mobility and Management Function (AMF) to another AMF. As another example, a mobility event can occur when a UE, such as a UAV, changes access type from one type to another, such as from a non-3GPP standard access type to a 3GPP standard access type. A table of example mobility events and their associated parameters is provided below.

TABLE 1

| Event ID | Event Filter (List of Parameter Values to Match) |
| --- | --- |
| Location Report | <Parameter Type = LocationFilter, Value = TA1> |
| UE moving in or out of Area of Interest | <Parameter Type = TAI, Value = TA1><br><Parameter Type = S-NSSAI, Value = S-NSSAI1><br><Parameter Type = NSI ID, Value = NSI ID1><br><Parameter Type = PRA ID, Value = PRA ID value> |
| Access Type | <Parameter Type = AN Type, Value = 3GPP Access"> |
| Location | <Parameter Type = TAI, Value = wildcard> (to report any TAI change) |
| Location | <Parameter Type = TAI Value = abnormal> (to report only when the TAI deviates from expected values based on Expected UE Moving Trajectory). |
| Reachability Filter | Applicable to the event UE reachability. Value = UE reachability status change or UE reachable for DL traffic. Absence of this parameter in UE reachability event request is interpreted as "UE reachability status change". |

In various embodiments, an AMF can notify a UE, such as a UAV, of a mobility event. For example, in the case of a handover of a UAV from one AMF (e.g., old AMF) to another AMF (e.g., new AMF), the old AMF can provide event subscriptions for the UAV to the new AMF. Based on the event subscriptions, the new AMF may determine that the UAV was subscribed to mobility events with the old AMF prior to the handover. Based on the UAV being subscribed to mobility events with the old AMF, the new AMF can provide a notification to Uncrewed Aircraft System (UAS) network function (NF) associated with the UE of a mobility event (e.g., the handover event). As another example, in the case of a handover of a UAV from an old AMF to a new AMF, the old AMF may provide information to the UAS NF of the UAV indicating that a handover event will occur or has occurred. The information can include, for example, an indication that there are zero remaining reports from the old AMF to be provided to the UAV. In some cases, an old AMF can notify a UAV that the UAV is moving out of an area associated with the old AMF. The UAV can determine based on the notification from the old AMF that a handover event will occur or has occurred.

In various embodiments, a UE can initiate an action in response to a mobility event. For example, a UAV can initiate a UAV UAS Authentication and Authorization (UUAA) procedure in response to a handover event. The UUAA procedure can authenticate and authorize the UAV to access the UAS service associated with the new AMF. In some cases, the UUAA procedure is supported by a UAS Service Supplier (USS) or a Third Party Authorized Entity (TPAE). The UAV can also update its records with information of the new AMF. The information of the new AMF can be stored, for example, in an unstructured data storage function (UDSF). As illustrated in these examples, a UE may take a variety of actions in response to a mobility event. These actions can include generating a request to subscribe to mobility event notifications, as further described herein.

Additionally, or alternatively, in various embodiments, an event may occur that prompts a UE to dissociate from a USS. For example, a subscription associated with a UAV may expire, be revocated, be terminated, or the like. In some cases, a subscription may fail to authenticate with a USS or fail to reauthenticate with the USS after a period of time. A USS may send an authorization revocation request to the UAV or a UAS NF associated with the UAV. In response to an event that prompts dissociation from a USS, a UE can generate a request to unsubscribe to mobility event notifications, as further described herein.

At block 208, the hardware processor(s) 202 may execute the machine-readable/machine-executable instructions stored in the machine-readable storage media 204 to generate a request to subscribe to mobility event notifications or to unsubscribe to mobility event notifications in response to the mobility event. In various embodiments, a NF associated with a UE, such as a UAV, can generate a request to subscribe to mobility event notifications in response to a mobility event, such as a handover event. In some cases, the request to subscribe can be generated based on a determination that a UUAA-MM procedure has succeeded and a UAS NF is not subscribed to an AMF for Mobility Event Exposure. For example, in response to a determination that a handover event from an old AMF to a new AMF has occurred, a UAS NF associated with a UAV can generate a subscription request (e.g., Namf_EventExposure_Subscribe) associated with the new AMF. The subscription request can include, for example, an ID associated with a NF, a subscription target, such as a UE, and event reporting information. The subscription request can also include event filters to modify an event subscription. The subscription request can enable an AMF to determine events for which to provide notifications and to determine UEs to which to provide the notifications.

Additionally, or alternatively, in various embodiments, a NF associated with a UE, such as a UAV, can generate a request to unsubscribe to mobility event notifications in response to an event that prompts dissociation from a USS, such as an expiration of a subscription. For example, in response to a revocation of authorization or a failure to authorize from a USS, a UAS NF associated with a UAV can generate an unsubscribe request (e.g., Namf_EventExposure_UnSubscribe) associated with an AMF. The unsubscribe request can include, for example, a subscription correlation ID associated with the subscription that is being unsubscribed. The unsubscribe request can enable an AMF to determine which events and to which UEs to stop providing notifications.

At block 210, the hardware processor(s) 202 may execute the machine-readable/machine-executable instructions stored in the machine-readable storage media 204 to send the request. In various embodiments, a UE, such as a UAV, can send a request to subscribe to mobility events or a request to unsubscribe to mobility events to an AMF. In general, messages between a UE and an AMF, such as subscription requests and unsubscribe requests, are routed by a radio access network (RAN) through which the UE and the AMF are connected. The RAN can be, for example, part of a 5G system.

At block 212, the hardware processor(s) 202 may execute the machine-readable/machine-executable instructions stored in the machine-readable storage media 204 to receive a response in response to the request. In various embodiments, a UE can receive a response to a request for a subscription to mobility events to confirm the subscription is accepted. The response can include a subscription correlation ID for management of the subscription. In some cases, a first or initial event report corresponding to the requested subscription can be sent with the response to the subscription request.

Additionally, or alternatively, in various embodiments, a UE can receive a response to a request to unsubscribe to mobility events to confirm that notifications for mobility events have been unsubscribed. The response can include a confirmation indicating that the unsubscribe operation was executed successfully.

Figure 3:
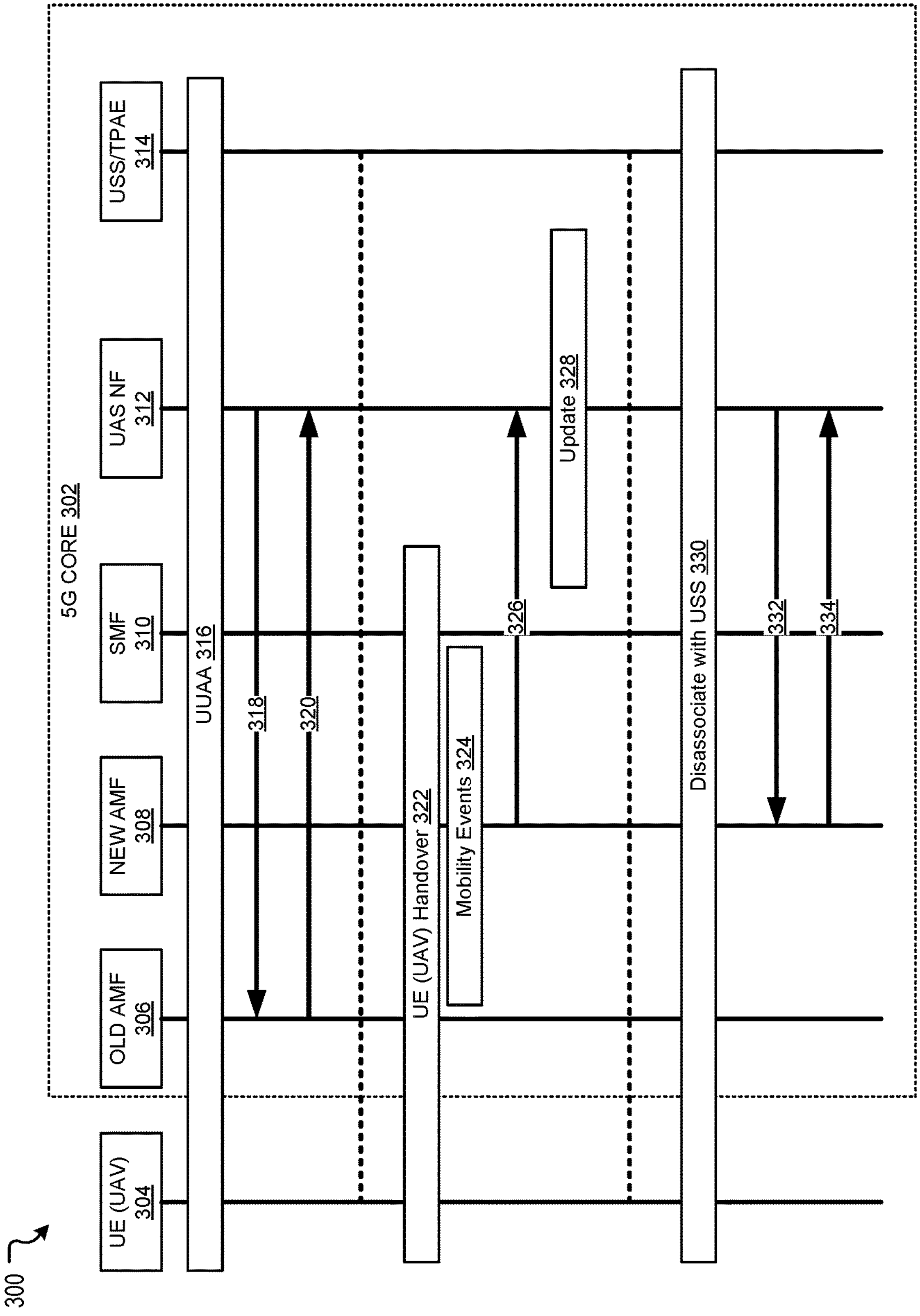
FIG. 3 illustrates an example flow chart according to various embodiments of the present disclosure.

FIG. 3 illustrates an example flow 300 associated with AMF mobility event exposure support for UAS. For example, the example flow 300 can illustrate control flows and procedures for interactions between user equipment (UE) and a 5G system core based on AMF Mobility Event Exposure capabilities. The example flow 300 can be associated with one or more functions performed by, for example, the example computing component 200 of FIG. 2. It should be understood that there can be additional, fewer, or alternative steps performed in similar or alternative orders, or in parallel, based on the various features and embodiments discussed herein unless otherwise stated.

As illustrated in FIG. 3, the example flow 300 involves a user equipment (UE) (Uncrewed Aerial Vehicle (UAV)) 304 and a 5G core 302. The 5G core 302 includes an old Access Mobility and Management Function (AMF) 306, a new AMF 308, a Session Management Function (SMF) 310, a Uncrewed Aircraft System (UAS) network function (NF) 312, and a UAS Service Supplier (USS)/Third Party Authorized Entity (TPAE) 314. At step 316, the UE (UAV) 304 successfully registers with the 5G core 302 through a UAV UAS Authentication and Authorization (UUAA) procedure. At step 318, the UAS NF 312 sends a subscription request to the old AMF 306. For example, the UAS NF 312 can send a Namf_EventExposure_Subscribe Request with parameters UAS NF ID, service S-NSSAI, GPSI. At step 320, the old AMF 306 acknowledges the UAS NF with a response for mobility events and provides a subscription correlation ID. For example, the old AMF 306 can send a Namf_EventExposure_Subscribe Response as described herein. A period of time may pass, and at step 322, a handover event occurs between the old AMF 306 and the new AMF 308. The handover event can involve transfer of UE contexts, including UUAA contexts, associated with the UE (UAV) 304 from the old AMF 306 to the new AMF 308. At step 324, the new AMF 308 detects a subscription of mobility events with respect to the UE (UAV) 304. At step 326, the new AMF 308 notifies the UAS NF 312 of the corresponding mobility event (e.g., the handover event at step 322). At step 328, the UAS NF 312 updates its local UUAA context with respect to the UE (UAV) 304 and initiate appropriate action based on the UUAA context. For example, the UAS NF 312 may update an unstructured data storage function (UDSF) with information of the new AMF 308 for the UE (UAV) 304 as well as any new subscription correlation ID. At step 330, an internal event or external event may happen that causes the UE (UAV) 304 to disassociate from the USS/TPAE 314. At step 332, the UAS NF 312 unsubscribes to mobility events by sending an unsubscribe request to the new AMF 308. For example, the UAS NF 312 can send a Namf_EventExposure_Unsubscribe Request with the appropriate subscription correlation ID. At step 334, the new AMF 308 receives the unsubscribe request from the UAS NF 312 and acknowledges the unsubscribe request by sending a response. For example, the new AMF 308 can send Namf_EventExposure_Unsubscribe Response to the UAS NF 312.

Figure 4A:
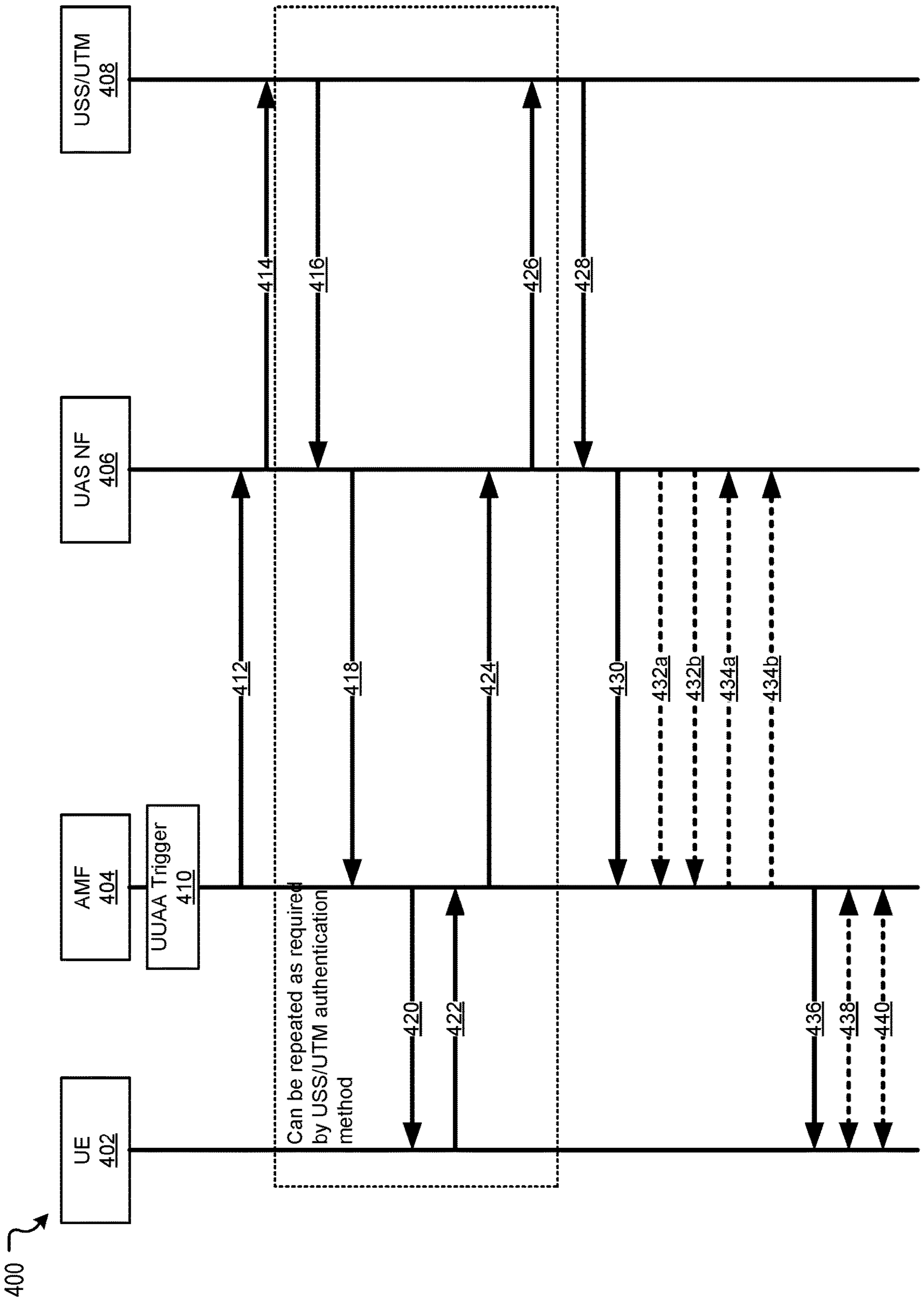
FIG. 4A and FIG. 4B illustrate example flow charts according to various embodiments of the present disclosure.
Figure 4B:
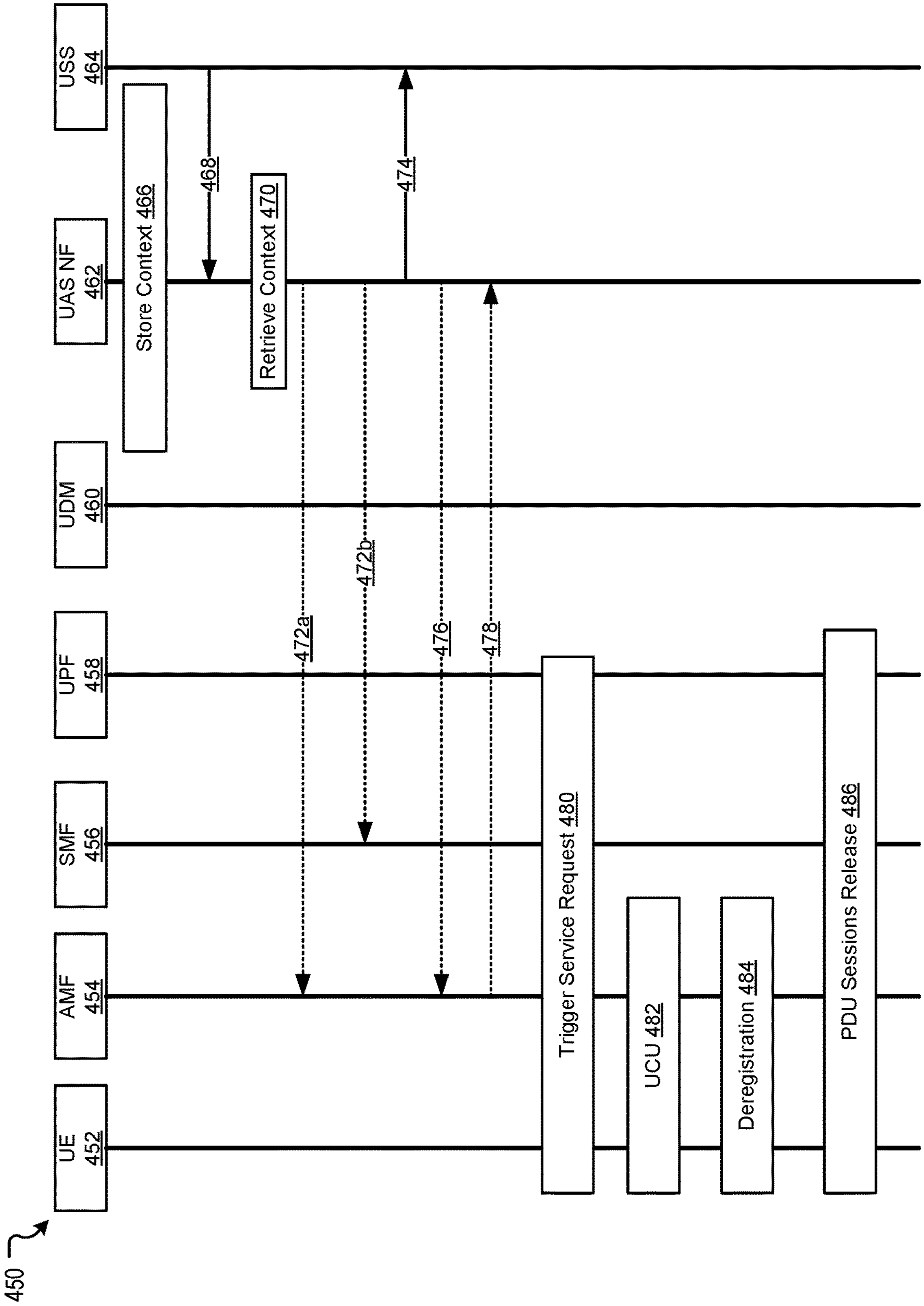

FIGS. 4A-4B illustrate example flows associated with AMF mobility event exposure support for UAS. For example, the example flows can illustrate subscribe requests and unsubscribe requests from a UAS NF to an AMF. The example flows can be associated with one or more functions performed by, for example, the example computing component 200 of FIG. 2. It should be understood that there can be additional, fewer, or alternative steps performed in similar or alternative orders, or in parallel, based on the various features and embodiments discussed herein unless otherwise stated.

FIG. 4A illustrates an example flow 400 associated subscribing and unsubscribing to mobility events following a successful UUAA Registration (UUAA-MM) procedure. As illustrated in FIG. 4A, the example flow 400 involves a UE 402, an AMF 404, a UAS NF 406, and a USS/UTM 408. For example, the UE 402 can be a UAV. At step 410, the AMF 404 triggers a UUAA-MM procedure. The UUAA-MM procedure can be triggered, for example, in response to a UUAA requirement or reauthentication. At step 412, the AMF 404 invokes a Nnef_Auth_Req service operation. The service operation can include the S-NSSAI, the GPSI and the CAA-Level UAV ID and may include USS address (e.g. FQDN). The UAS NF 406 resolves the USS address based on CAA-Level UAV ID or uses the provided USS address. At step 414, the UAS NF 406 sends an authentication request to the USS/UTM 408. The authentication request can include the GPSI and CAA-Level UAV ID. At step 416, the USS/UTM 408 sends an authentication response message to the UAS NF 406. At step 418, the UAS NF 406 sends a Nnef_Auth_Resp authentication response message to the AMF 404. At step 420, the AMF 404 forwards the authentication message using a NAS MM transport message to UE 402. At step 422, the UE 402 sends an authentication request using a NAS MM transport message to AMF 404. At step 424, the AMF 404 sends a Nnef_Auth_Req authentication request to the UAS NF 406. At step 426, the UAS NF 406 sends an authentication request to the USS/UTM 408. In some cases, steps 416 to 426 may be repeated for multiple round trip messages as required by the authentication method used by the USS/UTM 408. At step 428, the USS/UTM 408 sends an authentication response to the UAS NF 406 that includes GPSI, a UUAA result (e.g., success, failure), an authorized CAA-level UAV ID, configuration information, such as security information to be used to communicate with the USS/UTM 408, and an authentication message based on the authentication method used. The authentication response in this step can be a final message for the authentication method used by the USS/UTM 408. At step 430, the UAS NF 406 sends an authentication response to the AMF 404, forwarding the information received from the USS/UTM 408. If the UUAA-MM procedure succeeded and the UAS NF 406 is not subscribed to the AMF 404 for Mobility Event Exposure, then at step 432*a*, the UAS NF 406 subscribes to the AMF 404 for mobility event notification. The UAS NF 406 can subscribe by sending a Namf_EventExposure_Subscribe request. At step 434*a*, the AMF 406 acknowledges the subscription request by sending a Namf_EventExposure_Subscribe response. If the UUAA-MM procedure failed and the UAS NF 406 is subscribed to the AMF 404 for Mobility Event Exposure, then at step 432*b*, the UAS NF 406 unsubscribes to the AMF 404 for mobility event notification. The UAS NF 406 can unsubscribe by sending a Namf_EventExposure_Unsubscribe request. At step 434*b*, the AMF 406 acknowledges the unsubscribe request by sending a Namf_EventExposure_Unsubscribe response. At step 436, the AMF 404 forwards the authentication message using a NAS MM transport message to UE 402 indicating whether the UUAA-MM procedure was successful or failed. At step 438, if the UUAA-MM procedure succeeded, the AMF 404 triggers a UE Configuration Update procedure to deliver authorization information from the USS/UTM 408 to the UE 402. If the UUAA-MM procedure fails during reauthentication or reauthorization and there are established PDU sessions using UAS services, the AMF 404 triggers the PDU sessions to release with the appropriate cause value. The AMF 404 can identify which PDU session is using UAS services based on DNN/S-NSSAI values of the PDU sessions. At step 440, if the UUAA-MM procedure fails, the AMF 404 may trigger a Network Initiated Deregistration procedure that includes a Deregistration Request with the appropriate rejection cause value. As illustrated in this example flow, sending a subscribe request or an unsubscribe request based on whether the UUAA-MM procedure was successful can help ensure appropriate mobility event notifications are provided to a UAS NF.

FIG. 4B illustrates an example flow 450 associated with unsubscribing from AMF mobility events in response to a UUAA revocation. As illustrated in FIG. 4B, the example flow 450 involves a UE 452, such as a UAV, an AMF 454, a SMF 456, a User Plane Function (UPF) 458, a Unified Data Management (UDM) 460, a UAS NF 462, and a USS 464. At step 466, UUAA context is stored in a UDSF or locally in the UAS NF 462. The UAS NF can create a subscription for notifications with the AMF 454 or the SMF 456 after a successful UUAA procedure. The notifications from the AMF 454 or the SMF 456 can trigger reauthentication, update authorization data, or revoke authorization of the UE 452. At step 468, the USS 464 sends an authorization revocation request to the UAS NF 462. The authorization revocation request can include GPSI, CAA-Level UAV ID, and PDU Session IP address, if available. At step 470, the UAS NF 462 retrieves stored UUAA context. The stored UUAA context can be used to determine a target for sending a notification of the authorization revocation request. If the UAS NF 462 has a subscription for notifications with the AMF 454, then at step 472*a*, the UAS NF 462 sends a Nnef_Auth_Notification request to notify the AMF 454 that UE 452 is no longer authorized. IF the UAS NF 462 has a subscription for notifications with the SMF 456, then at step 472*b*, the UAS NF 462 sends a Nnef_Auth_Notification request to notify the SMF 456 that UE 452 is no longer authorized. At step 474, the UAS NF 462 responds to the USS 464 indicating that the authorization revocation request has been successfully initiated. At step 476, if the UAS NF 462 is subscribed to the AMF 454 for Mobility Event Exposure, then the UAS NF 462 unsubscribes to the AMF 454 for mobility event notification by sending a Namf_EventExposure_Unsubscribe request with the appropriate subscription correlation ID. At step 478, the AMF 454 acknowledges the unsubscribe request by sending a Namf_EventExposure_Unsubscribe response. At step 480, if the UE 452 is in a CM_Idle state, then the AMF 454 or the SMF 456, depending on which was the target of the authorization revocation request, initiates a Network Triggered Service Request procedure. If the AMF 454 was the target, then at step 482, the AMF 454 initiates a UE Configuration Update (UCU) procedure to inform the UE 452 that UUAA is revoked. The AMF 454 also initiates release of PDU Sessions related to UAS services. At step 484, the AMF 454 may start network initiated deregistration processes based on network policy. If the SMF 456 was the target, then at step 486, the SMF 456 starts network initiated PDU session release processes to release associated PDU sessions. As illustrated in this example, sending an unsubscribe request when UUAA authorization is revoked can help ensure mobility event notifications are not provided to an unauthorized UAS NF.

Figure 5:
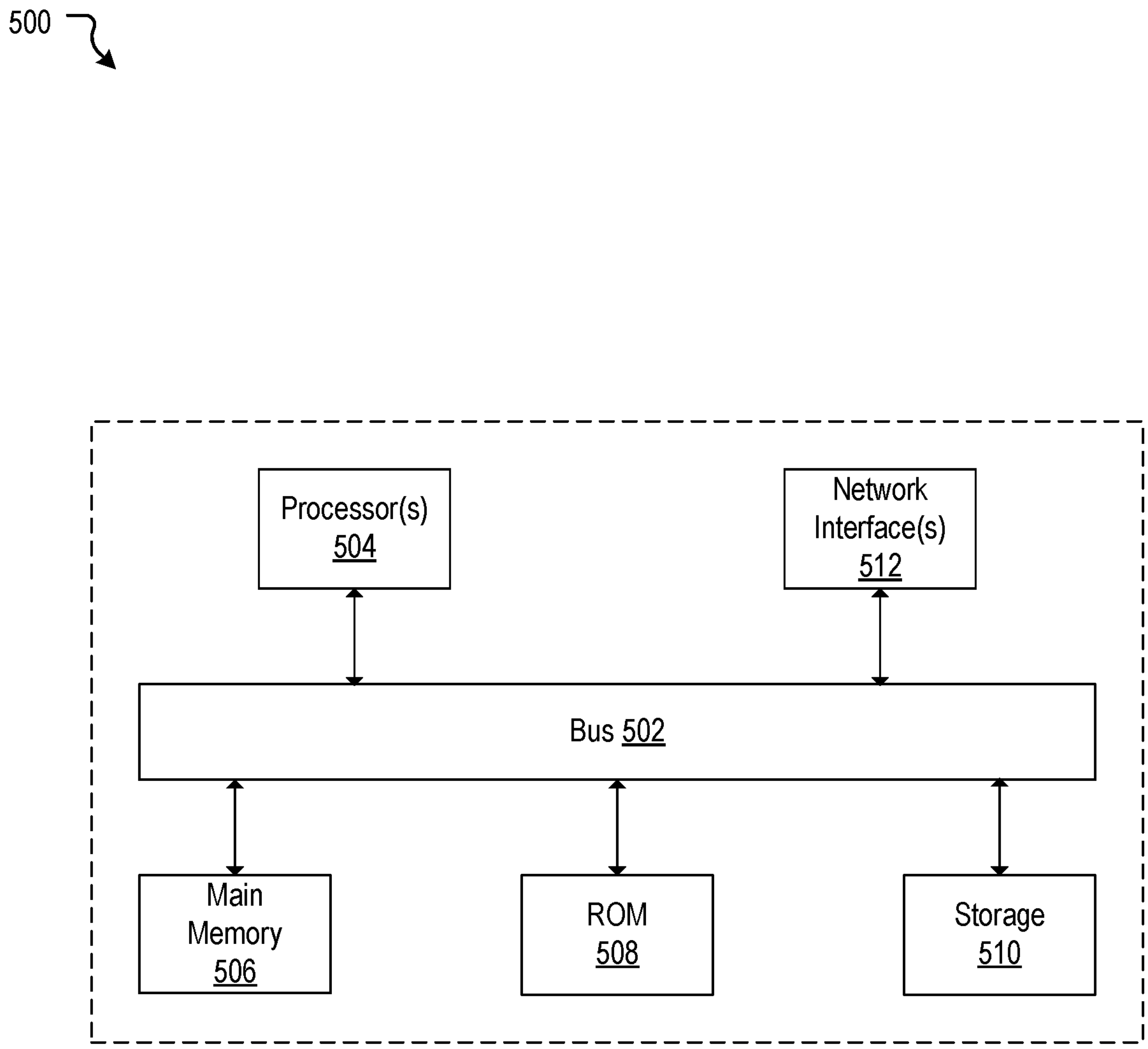
FIG. 5 illustrates a block diagram of an example computer system in which various embodiments of the present disclosure may be implemented.

FIG. 5 illustrates a block diagram of an example computer system 500 in which various embodiments of the present disclosure may be implemented. The computer system 500 can include a bus 502 or other communication mechanism for communicating information, one or more hardware processors 504 coupled with the bus 502 for processing information. The hardware processor(s) 504 may be, for example, one or more general purpose microprocessors. The computer system 500 may be an embodiment of a video encoding module, video decoding module, video encoder, video decoder, or similar device.

The computer system 500 can also include a main memory 506, such as a random access memory (RAM), cache and/or other dynamic storage devices, coupled to the bus 502 for storing information and instructions to be executed by the hardware processor(s) 504. The main memory 506 may also be used for storing temporary variables or other intermediate information during execution of instructions by the hardware processor(s) 504. Such instructions, when stored in a storage media accessible to the hardware processor(s) 504, render the computer system 500 into a special-purpose machine that can be customized to perform the operations specified in the instructions.

The computer system 500 can further include a read only memory (ROM) 508 or other static storage device coupled to the bus 502 for storing static information and instructions for the hardware processor(s) 504. A storage device 510, such as a magnetic disk, optical disk, or USB thumb drive (Flash drive), etc., can be provided and coupled to the bus 502 for storing information and instructions.

Computer system 500 can further include at least one network interface 512, such as a network interface controller module (NIC), network adapter, or the like, or a combination thereof, coupled to the bus 502 for connecting the computer system 500 to at least one network.

In general, the word "component," "modules," "engine," "system," "database," and the like, as used herein, can refer to logic embodied in hardware or firmware, or to a collection of software instructions, possibly having entry and exit points, written in a programming language, such as, for example, Java, C or C++. A software component or module may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices, such as the computing system 500, may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of an executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques or technology described herein using customized hard-wired logic, one or more ASICs or FPGAs, firmware and/or program logic which in combination with the computer system 500 that causes or programs the computer system 500 to be a special-purpose machine. According to one or more embodiments, the techniques described herein are performed by the computer system 500 in response to the hardware processor(s) 504 executing one or more sequences of one or more instructions contained in the main memory 506. Such instructions may be read into the main memory 506 from another storage medium, such as the storage device 510. Execution of the sequences of instructions contained in the main memory 506 can cause the hardware processor(s) 504 to perform process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. The non-volatile media can include, for example, optical or magnetic disks, such as the storage device 510. The volatile media can include dynamic memory, such as the main memory 506. Common forms of the non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, an NVRAM, any other memory chip or cartridge, and networked versions of the same.

Non-transitory media is distinct from but may be used in conjunction with transmission media. The transmission media can participate in transferring information between the non-transitory media. For example, the transmission media can include coaxial cables, copper wire and fiber optics, including the wires that comprise the bus 502. The transmission media can also take a form of acoustic or light waves, such as those generated during radio-wave and infra-red data communications.

The computer system 500 also includes a network interface 518 coupled to bus 502. Network interface 518 provides a two-way data communication coupling to one or more network links that are connected to one or more local networks. For example, network interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicated with a WAN). Wireless links may also be implemented. In any such implementation, network interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through network interface 518, which carry the digital data to and from computer system 500, are example forms of transmission media.

The computer system 500 can send messages and receive data, including program code, through the network(s), network link and network interface 518. In the Internet example, a server might transmit a requested code for an application program through the Internet, the ISP, the local network and the network interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computer-implemented method for subscribing or unsubscribing to mobility event notifications comprising:

determining a mobility event associated with a user equipment (UE);

generating a request to subscribe to the mobility event notifications or to unsubscribe from the mobility event notifications in response to the mobility event;

sending the request;

receiving a response in response to the request; and acknowledging subscribing or unsubscribing to the mobility event notifications based on the response;

further comprising:

initiating an authorization procedure in response to the mobility event;

determining whether the authorization procedure succeeded; and determining whether the UE is subscribed to the mobility event notifications;

wherein in a case that the authorization procedure succeeded and the UE is not subscribed to the mobility event notifications, the request to subscribe to the mobility event notifications is generated; and in a case that the authorization procedure failed and the UE is subscribed to the mobility event notifications, the request to unsubscribe from the mobility event notifications is generated.

2. The computer-implemented method of claim 1, further comprising:

determining an event associated with dissociation from an uncrewed aircraft system (UAS) service supplier; and generating a second request to unsubscribe from the mobility event notifications based on the event.

3. The computer-implemented method of claim 2, wherein the determining the event associated with the dissociation from the UAS service supplier comprises:

receiving an authorization revocation request, wherein the generating the second request to unsubscribe is subsequent to the receiving the authorization revocation request.

4. The computer-implemented method of claim 1, wherein the request to subscribe to the mobility event notifications includes a subscription correlation ID for management of a subscription for mobility event notifications and the response includes a first event report corresponding to the subscription.

5. The computer-implemented method of claim 1, wherein the request to subscribe to the mobility event notification is a Namf_EventExposure_Subscribe request and the request to unsubscribe from the mobility event notifications is a Namf_EventExposure_UnSubscribe request.

6. The computer-implemented method of claim 1, wherein the UE is associated with a handover event from a first Access Mobility and Management Function (AMF) to a second AMF, wherein the request is sent to the second AMF, and wherein the response is received from the second AMF.

7. A system comprising:

at least one processor; and a memory storing instructions that, when executed by the at least one processor, cause the system to perform:

determining a mobility event associated with a user equipment (UE);

generating a first request to subscribe to a mobility event notifications;

receiving a notification associated with a subscription to the mobility event notifications;

determining a revocation of authorization received from an uncrewed aircraft system (UAS) service supplier; and generating a second request to unsubscribe from the mobility event notifications based on the revocation of authorization;

wherein the instructions cause the system to further perform:

initiating an authorization procedure in response to the mobility event;

determining whether the authorization procedure succeeded; and determining whether the UE is subscribed to the mobility event notifications;

wherein in a case that the authorization procedure succeeded and the UE is not subscribed to the mobility event notifications, a request to subscribe to the mobility event notifications is generated; and in a case that the authorization procedure failed and the UE is subscribed to the mobility event notifications, a request to unsubscribe from the mobility event notifications is generated.

8. The system of claim 7, wherein the request to subscribe to the mobility event notifications includes a subscription correlation ID for management of a subscription for mobility event notifications and the response includes a first event report corresponding to the subscription.

9. The system of claim 7, wherein the request to subscribe to the mobility event notification is a Namf_EventExposure_Subscribe request and the request to unsubscribe from the mobility event notifications is a Namf_EventExposure_UnSubscribe request.

10. The system of claim 7, wherein the UE is an uncrewed aerial vehicle (UAV).

11. A non-transitory computer-readable storage medium including instructions that, when executed by at least one processor of a computing system, cause the computing system to perform:

determining a termination of a user equipment (UE) subscription;

generating a request to unsubscribe to a mobility event notifications from an Access Mobility and Management Function (AMF) in response to the termination of the UE subscription;

sending the request to the AMF; and receiving a response from the AMF in response to the request, wherein the response acknowledges the unsubscribe;

wherein the instructions cause the computing system to further perform:

initiating an authorization procedure in response to a mobility event;

determining whether the authorization procedure succeeded; and determining whether the UE is subscribed to the mobility event notifications;

wherein in a case that the authorization procedure succeeded and the UE is not subscribed to the mobility event notifications, a request to subscribe to the mobility event notifications is generated; and in a case that the authorization procedure failed and the UE is subscribed to the mobility event notifications, a request to unsubscribe from the mobility event notifications is generated.

12. The non-transitory computer-readable storage medium of claim 11, wherein the request to unsubscribe to the mobility event notifications includes a subscription correlation ID for management of a subscription for mobility event notifications.

13. The non-transitory computer-readable storage medium of claim 11, wherein the instructions further cause the computing system to further perform:

receiving an authorization revocation request, wherein the request to unsubscribe is subsequent to the receiving the authorization revocation request.

14. The non-transitory computer-readable storage medium of claim 11, wherein the request to unsubscribe from the mobility event notifications is a Namf_EventExposure_UnSubscribe request.

* * * * *